United States Patent Office 3,423,812
Patented Jan. 28, 1969

3,423,812
MULTIPLE SPINDLE MACHINE
Guenter Spur, Berlin, Germany, assignor to Werkzeugmaschinenfabrik Gildemeister & Comp. AG, Bielefeld, Germany
Filed Sept. 6, 1966, Ser. No. 577,254
Claims priority, application Germany, Sept. 29, 1965, W 39,998
U.S. Cl. 29—38
Int. Cl. B23p 23/04
13 Claims

ABSTRACT OF THE DISCLOSURE

A multiple spindle machine tool wherein one or more working stations accommodate tool changers which can exchange tools in the course of a working cycle so that the workpieces can be subjected to several treatments whose number exceeds the number of working stations. The exchange of tools can take place during indexing of the spindle carrier or while the carrier dwells between successive indexing movements.

---

The present invention relates to multiple spindle chucking or bar machines.

In presently known multiple spindle machines with frame-supported tools, rapid traverse and infeed movements of tool slides, as well as indexing movements of the spindle carrier, are controlled by cams which are mounted on a single or composite cam shaft. All signals necessary for automatic operation are determined by the cams. Such multiple spindle machines are preferably employed in mass-production of identical articles and their important advantage over single spindle machines is that each workpiece can be treated in a plurality of stages at a plurality of working or treating stations. Each working station accommodates a tool holder. The output of such machines is very high but the intervals necessary to convert the machines for treatment of a batch of different workpieces are quite long so that the machine is idle for extended periods of time. Furthermore, the machines must be furnished with several sets of control cams which must be finished with a high degree of precision and must be carefully stored when not in use.

Accordingly, it is an important object of the present invention to provide a multiple spindle machine which can be rapidly converted for treatment of different types of work-pieces and which, due to considerable reduction in time required to change the setup, can be used for treatment of medium sized or small lots.

Another object of the invention is to provide a multiple spindle automatic chucking or bar machine which need not be furnished with spare cams, wherein a change in setup can be carried out while the machine is in actual use, which can perform a large number of different operations with a small number of work spindles, and which is more versatile than presently known machines with the same number of work spindles.

A further object of the invention is to provide a novel method of treating workpieces in a multiple spindle chucking or bar machine.

An additional object of the invention is to provide a novel programming system for a multiple spindle machine.

One feature of the present invention resides in the provision of a method of treating workpieces in a multiple spindle chucking or bar machine wherein the workpieces are indexed between two or more working stations and wherein at least one of the stations accommodates a plurality of tools each of which is movable into and from material-removing engagement with the workpieces. The method comprises the steps of indexing the workpieces in a series of successive steps so that each workpiece dwells at least once at each working station, treating each workpiece by a tool of a first set of tools at each such station, and treating each workpiece by at least one additional tool at the one working station.

For example, each workpiece may be repeatedly treated at each of the working stations and is indexed between successive treatments so that it is treated by a tool of a first set of tools at each successive working station during a first revolution of the spindle carrier, and is thereupon treated by a second tool at each successive working station during the second revolution of the spindle carrier. Thus, the number of treatments can be a multiple of the number of work spindles in the machine.

Alternatively, each workpiece may dwell at the one working station long enough to undergo treatment by a plurality of tools before the spindle carrier is indexed to move such workpiece to the next station. It is also possible to advance each workpiece repeatedly to each of the working stations and to subject the workpieces at the one station to treatment by two or more tools. If the machine comprises two work spindles and two working stations, and if each working station accommodates an automatically indexible turret capable of supporting a plurality of tools, the workpieces may be indexed four times so that each thereof dwells twice at each working station. The turrets will be indexed after the two workpieces have been indexed twice and then place a second set of tools into requisite position for removal of material from the workpieces at the respective stations. If each turret carries three tools, the machine can complete a six-stage treatment of workpieces in response to three full revolutions of the spindle carrier like a six-spindle machine.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawings, in which:

Figure 1:
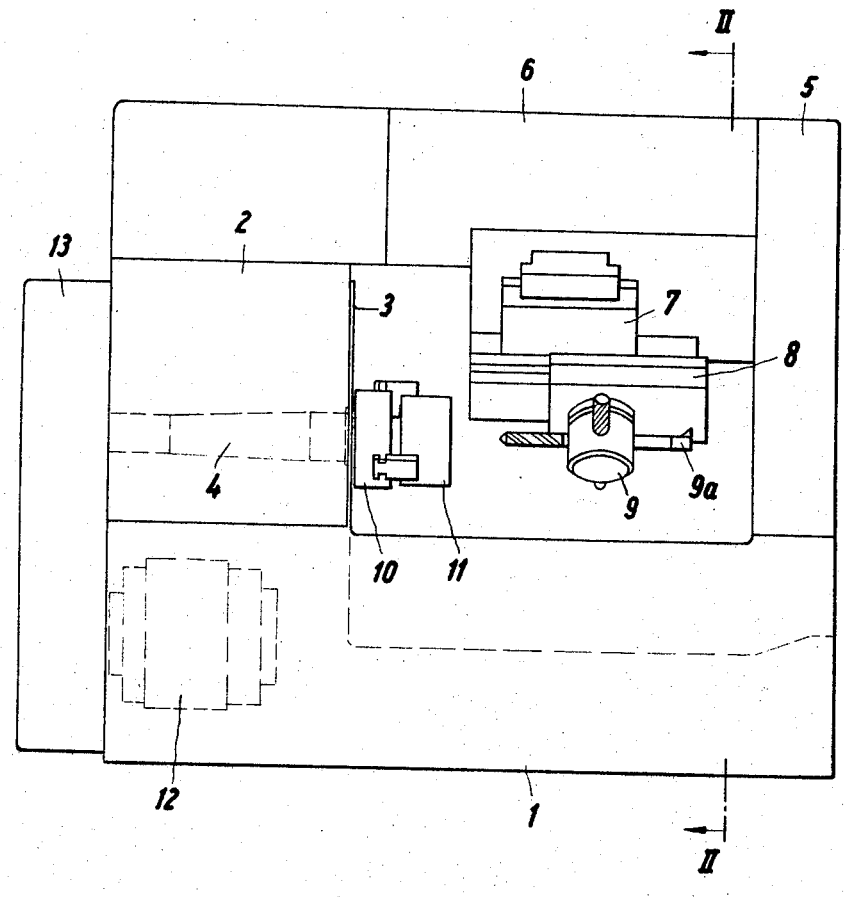
FIG. 1 is a schematic side elevational view of a multiple spindle chucking machine which embodies one form of the present invention and is provided with two work spindles.
Figure 2:
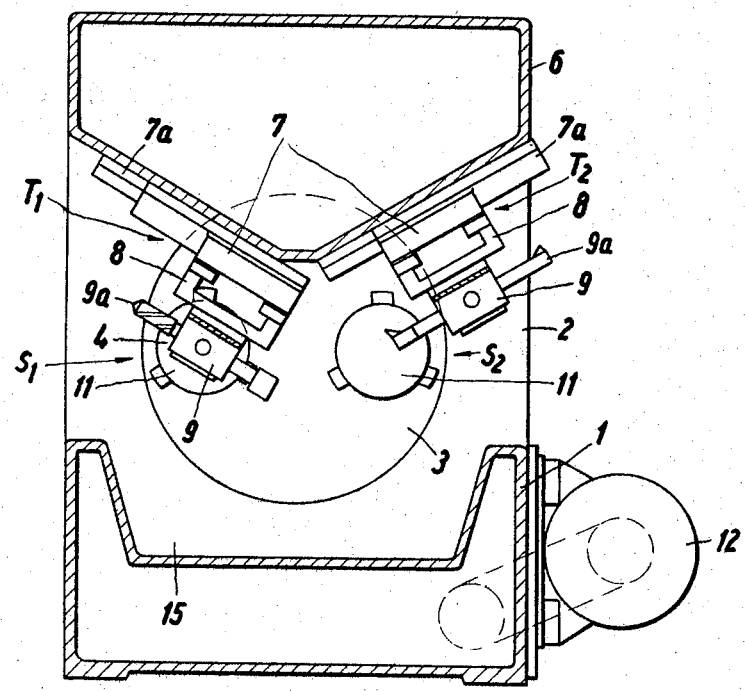
FIG. 2 is a transverse vertical section as seen in the direction of arrows from the line II—II of FIG. 1.

Referring first to FIGS. 1 and 2, there is shown a multiple spindle chucking machine which comprises a frame including a base 1, a pair of columns 2, 5 which extend upwardly from the base 1 and are spaced from each other, and a crosshead 6 which connects the upper ends of the columns. The column 2 accommodates a spindle carrier 3 which is indexible about a horizontal axis and carries two work spindles 4 located diametrically opposite each other with reference to the carrier axis. The forward end portions of the spindles 4 extend into the area bounded by the parts 1, 2, 5, 6 and carry chucks 10 for workpieces 11.

The crosshead 6 supports two tool supports T1, T2 which are respectively located at two working or material removing stations S1, S2. When the carrier 3 is idle, each of the two workpieces 11 is accommodated at one of the working stations S1, S2 and can be engaged by a selected tool 9a. Each tool support comprises ways 7a fixed to the crosshead 6, a transversely movable upper slide or carriage 7 which is movable along the respective ways 7a in directions at right angles to the axes of the spindles 4, and a longitudinally movable lower slide or carriage 8 which is slidable in ways defined therefor by the slide 7. Each of the lower slides 8 carries a rotary turret 9 capable of supporting several (for example, four) radially outwardly extending tools 9a. Each turret 9 constitutes a tool changing means and may be indexed to a series of positions in each of which a different tool 9a is ready to engage a workpiece 11 in response to movement of the associated slide 7 with reference to the ways 7a, in response to movement of the associated slide 8 with reference to the slide 7, or in response to movement of both slides with reference to each other and with reference to the ways 7a. The turrets 9 can be replaced by slides which are reciprocable on the slides 8 and carry one or more rows of tools.

The drive means for rotating the work spindles 4 about their own axes comprises a main motor 12 which is mounted on the base 1 and drives a variable speed transmission 13 whose output element or elements drive the spindles.

The base 1 is provided with or supports a tray or pan 15 which receives shavings and cutting oil. FIG. 2 shows that the area bounded by the parts 1, 2, 5 and 6 is fully open at two sides so that the spindles 4, their chucks 10, the workpieces 11 and the tools 9a are readily accessible from either side of the frame. Also, and due to the fact that the tool supports T1, T2 are suspended on the crosshead 6, all shavings removed from the workpieces 11 can descend freely into the pan 15 without interference on the part of the tools 9a.

The indexing means for the carrier 3 is not shown in FIGS. 1 and 2. Such indexing means will be controlled by a suitable programming system, preferably by a programming system of the type which will be described in connection with FIG. 4, so that all movements necessary to complete the treatment of workpieces 11 can be carried out in a desired sequence. The programming system can also control the feed of cutting oil, the feed of workpiece blanks to the chucks 10, and the removal of finished workpieces.

For example, and assuming that each of the two workpieces 11 shown in FIG. 2 requires four different treatments, the programming system will index the carrier 3 four times so that each of the chucks 10 will dwell twice at each of the two working stations S1, S2. While a first workpiece 11 dwells at the station S1 and is treated by one of the tools 9a in the left-hand turret 9, the other workpiece 11 is treated by a tool 9a at the station S2. The carrier 3 is then indexed 180 degrees and the same procedure is repeated. During next indexing of the carrier 3, the programming system changes the angular position of the turrets 9 so that the two workpieces are subjected to a third treatment and thereupon to a fourth treatment subsequent to fourth indexing of the carrier. Thus, though the machine shown in FIGS. 1 and 2 comprises only two work spindles, it can subject each workpiece to the same number of treatments as a machine having four, six, eight or more work spindles.

Of course, the machine of FIGS. 1 and 2 can also be operated in such a way that, while a workpiece 11 dwells at the station S1 or S2, the corresponding turret 9 is indexed once or more than once so that such workpiece undergoes two or more different treatments before the carrier 3 is indexed to assume a fresh angular position. Furthermore and, particularly if one of the tools in the one of the other turret 9 requires more time to complete a certain treatment, the other turret may be indexed once or more than once to subject the adjoining workpiece to two or more treatments so that the workpieces will be finished in response to a single rotation about the axis of the carrier 3.

Figure 3:
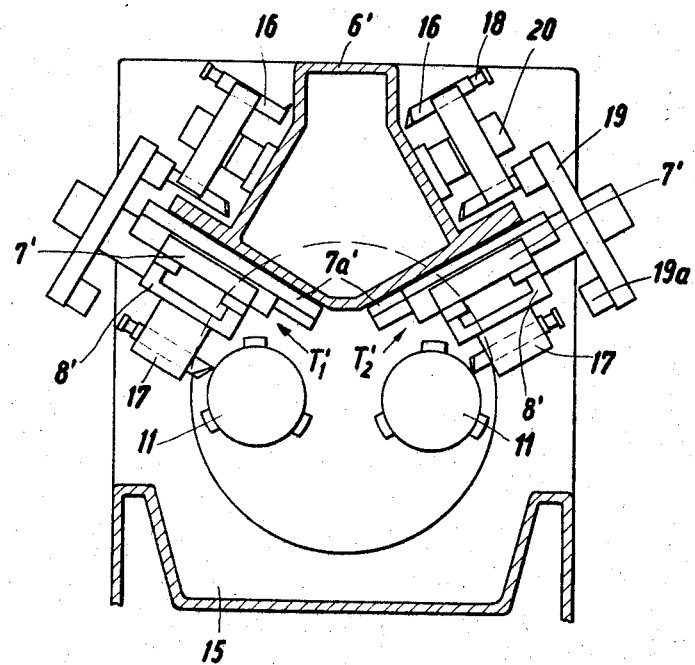
FIG. 3 is a similar transverse vertical section through a modified multiple spindle chucking machine.

FIG. 3 illustrates a portion of a modified multiple spindle chucking machine whose frame comprises a crosshead 6' for two tool supports $T_2'$, $T_2'$ each including elongated ways 7a' for a transversely movable slide 7' which in turn comprises ways for a longitudinally movable slide 8'. Each slide 8' carries a single socket or holder 17 for a tool 16.

Each tool support further includes a rotary magazine 20 mounted on the crosshead 6' and adapted to support a series of spare tools 16, and a transfer device 19 which can transfer tools from the magazine 20 to the respective socket 17 or vice versa. Otherwise, the construction of this machine need not differ from that of the machine shown in FIGS. 1 and 2. Of course, the machine of my invention may comprise three or more work spindles and an equal number of tool supports.

The rear ends of the tools 16 are provided with suitable heads 18 which can be gripped by the tool engaging portions 19a of the respective transfer devices 19.

Figure 4:
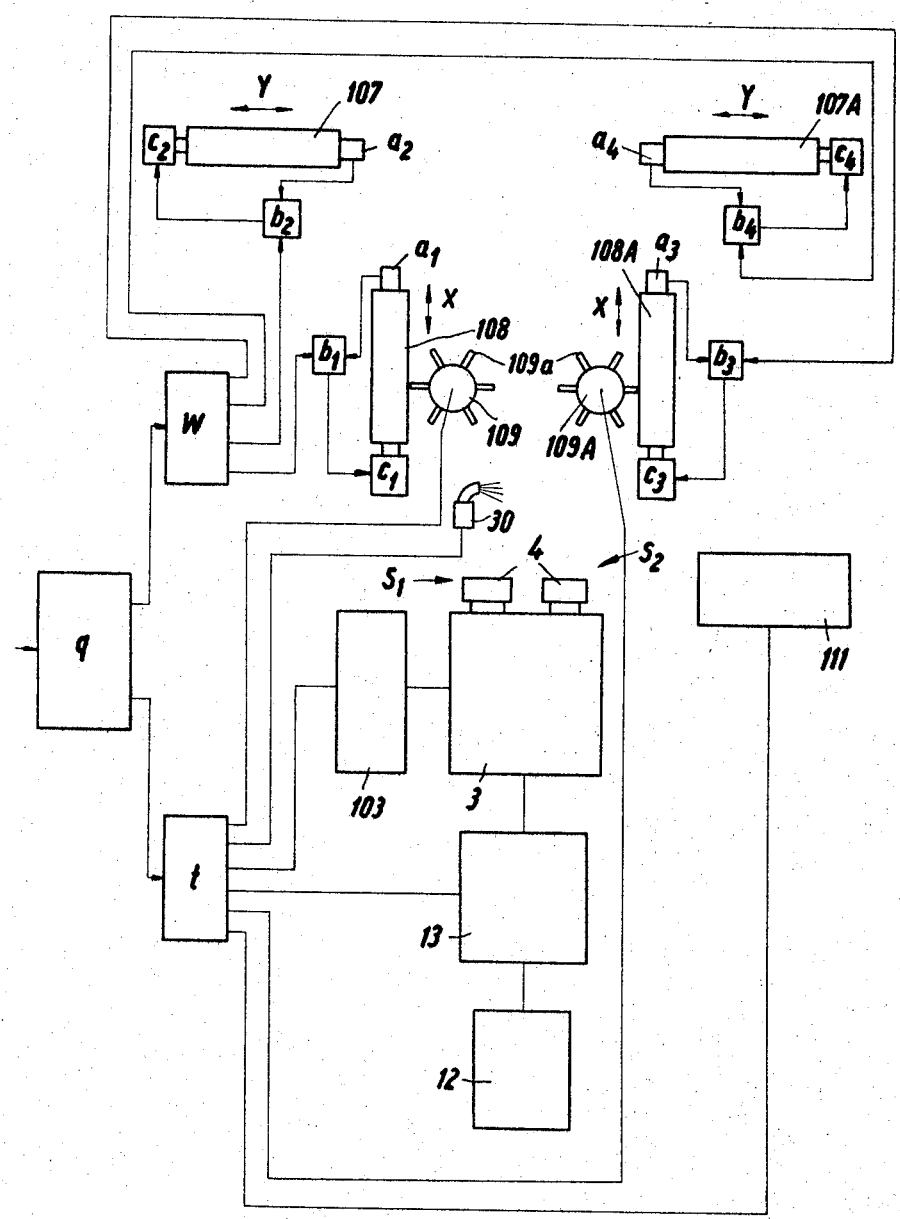
FIG. 4 is a diagram showing a novel programming unit for the improved multiple spindle machine.

The programming system of FIG. 4 may be of the electric or hydraulic type and comprises a computer having a decoding device $q$ for perforated tape which supplies information to two signal storing devices $t$ and $w$. The storing device $t$ receives information and transmits signals which initiate the indexing of the carrier 3 by means of an indexing mechanism 103, the rotation of work spindles 4 by means of the transmission 13, the feed of cutting oil by a nozzle 30, the feed of fresh workpieces by a feeding device 111, and the indexing of turrets 109, 109A for tools 109a. The storing device $w$ receives information and transmits signals controlling the extent of movement of slides 107, 108 and 107A, 108A for the turrets 109, 109A. That output of the storing device $t$ which is connected with the feeding device 111 can be used to arrest the motor 12 or transmission 13 if the workpieces are fed by hand or by a separately controlled feeding device.

The storing device $w$ has four outputs which are connected with comparators $b_1$, $b_2$, $b_3$, $b_4$ respectively associated with the slides 108, 107, 108A, 107A. The slides 108, 108A are reciprocable in the axial direction of the work spindles 4 as indicated by double-headed arrows X, and the slides 107, 107A are reciprocable at right angles to the axes of the work spindles as indicated by double-headed arrows Y. FIG. 4 should be interpreted with reference to FIGS. 1 and 2, i.e., the slides 108, 108A are respectively mounted on slides 107, 107A and carry the turrets 109, 109A.

The comparators $b_1$–$b_4$ respectively transmit signals to drives $c_1$, $c_2$, $c_3$, $c_4$ for the slides 108, 107, 108A, 107A. The characters $a_1$, $a_2$, $a_3$, $a_4$ respectively denote devices which measure the distances covered by the slides 108, 107, 108A, 107A and these measuring devices send signals to the comparators $b_1$–$b_4$. When one of the measuring devices $a_1$–$a_4$ sends to the respective comparator $b_1$–$b_4$ a signal of predetermined intensity, movement of the respective slide is terminated to complete the treatment of the workpiece at the station $S_1$ or $S_2$.

It is now assumed that each of the workpieces carried by the spindles 4 requires four different treatments. A working cycle is then completed in response to two full revolutions of the carrier 3 as follows:

The storing device $t$ transmits a signal to the feeding device 111 which introduces a fresh workpiece into the chuck of the spindle 4 at the station $S_2$. The other spindle 4 at the station $S_1$ already holds a workpiece. The information supplied by the decoding device $q$ to the storing device $t$ is being utilized to adjust the transmission 13 in order to select the number of spindle revolutions and the speed of spindles, to start the admission of cutting liquid via nozzle 30, to index the turrets 109, 109A and to select the speed of infeed.

The information fed to the storing device $w$ pertains to rated distances which are continuously compared with actual distances covered by the slides 108, 107, 108A, 107A. As stated before, information regarding such rated distances is fed to the four comparators $b_1$–$b_4$, and information regarding actual distances is furnished to such comparators by the measuring devices $c_1$–$c_4$. If a signal indicating a rated value is cancelled by a signal indicating the actual or measured value of the distance, the respective slide comes to a halt. The respective comparator then receives from the storing device $w$ a fresh signal indicating the next rated distance.

The signals indicating spindle speeds, the number of spindle revolutions, the speed of infeed and/or indexing speed may be varied not only upon completion but also in the course of a working cycle. The controls for the two spindles are independent of each other.

When the treatment by tools 109a at the stations $S_1$, and $S_2$ is completed, the device $t$ sends to the indexing mechanism 103 a signal to turn the carrier 3 through 180 degrees whereupon the two workpieces undergo a second treatment without indexing of the turrets 109, 109A. In the course of the next indexing of the carrier 3, the turrets 109, 109A are indexed to new positions so that each of the two workpieces can be subjected to a third treatment and, on renewed indexing of the carrier 3, to a fourth and last treatment.

Of course, one or both turrets 109, 109A may be indexed while the workpieces dwell at the receptive stations so that each such workpiece can be treated in two or more stages without necessitating indexing of the carrier 3. Furthermore, one of the tool supports can be omitted altogether. Also, the parts 107A 108A, 109A at the stations $S_2$ of FIG. 4 can be replaced by a transfer unit which transfers tools between a magazine and a socket carried by the slide 108 so that the machine will include a tool support of the type shown in FIGS. 1–2 and a tool support of the type shown in FIG. 3. If the machine comprises only two work spindles and a single tool support, such tool support is preferably installed at the station $S_1$ so that the station $S_2$ is less crowded and the means for feeding and removing workpieces can occupy more room.

The cost of a computerized programming system depends on the number of distance measuring devices. Therefore, and in order to reduce the number of such devices ($a_1$–$a_4$), I prefer to reduce the number of work spindles 4 to a minimum and to provide tool changing devices 109, 109A so that a working cycle may be completed in response to one or more revolutions of the carrier 3, depending upon whether the devices 109, 109A are indexed while the workpieces dwell at the respective stations or whether the devices 109, 109A are indexed subsequent to each revolution of the carrier. A computerized programming system can readily control the indexing of the carrier 3 and the indexing of the devices 109, 109A.

If the machine comprises three work spindles and a total of six distance measuring devices (two at each station), and if a cycle is completed in response to three revolutions of the carrier, such a machine can replace a conventional machine with nine work spindles. Each support then comprises a tool changing device which carries at least three tools or each tool support comprises a magazine for a minimum of two tools (the third tool being located in the socket corresponding to the sockets 17 shown in FIG. 3).

The machine shown in FIG. 4 can replace a machine with four, six, eight, ten or twelve work spindles because each of the turrets 109, 109A can carry six tools. Up to twelve different operations can be completed in response to up to six revolutions of the carrier 3 or in response to a single revolution if the turrets 109, 109A are indexed while the workpieces dwell at the respective stations. It will be seen that the basic construction of my improved machine is dependent solely on the actual number of work spindles and tool supports, not on the number of treatments to which the workpieces must be subjected. In conventional machines of this character, the number of desired treatments will determine the number of work spindles and tool supports.

The advantages of my machine can be summarized as follows:

Rapid traverse and infeed movements of slides in the tool supports can be controlled without resorting to conventional cams.

The advantages of multiple spindle operation are combined with advantages of a computerized programming operation which reduces the times required for complete treatment of individual workpieces and for setups.

The machine can be used economically for treatment of large, medium or small lots of workpieces.

Different types of workpieces can be treated simultaneously or consecutively without necessitating any changes in setup. Two lots of workpieces can be treated simultaneously if the workpieces of both lots can be treated by identical tools.

Each tool can be fed lengthwise or transversely, at any desired speed and through any desired distance.

A workpiece can be connected with or disconnected from one of the spindles while the other workpiece or workpieces undergo treatment at the other working station or stations.

The tools which are not in actual use can be inspected, removed and/or replaced by different tools while the machine is in actual use so that the setup for the next operation can be completed (either entirely or in part) simultaneously with treatment at one or more stations.

When the carrier supports only two work spindles, the diameters of such spindles and of their chucks can be larger than in a machine with four or more spindles but the two spindle machine can perform the same type of work as a machine with more than two spindles.

The machine can carry out operations which, heretofore, were performed by copying lathes.

Without further analysis, the foregoing will so fully reveal the gist of the present invention that others can, be applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a machine tool, a frame; a carrier rotatably mounted in said frame; a plurality of rotary work spindles mounted in said carrier and indexible therewith between a plurality of working stations at each of which the workpieces carried by said spindles are subjected to treatment during a working cycle; a plurality of tool supports each movably mounted in said frame at one of said stations, at least one of said tool supports comprising tool changing means operative to place at least two tools of a set of tools into position for engagement with the workpiece at the respective station prior to completion of a working cycle so that the number of treatments to which a workpiece is subjected during such cycle exceeds the number of working stations; and automatic programming means for operating said tool changing means during a working cycle.

2. In a machine tool, a frame; a carrier mounted in said frame for rotation about a substantially horizontal axis; a plurality of rotary work spindles mounted in said carrier and indexible therewith between a plurality of working stations at each of which the workpieces carried by said spindles are subjected to treatment during a working cycle, such treatment including treatment by several tools at least at one of said stations; a plurality of tool supports each mounted in said frame at one of said stations and each comprising a first slide movable in the axial direction and a second slide movable at right angles to the axes of said spindles, one of said spindles being supported by said frame and the other spindle being supported by said one slide, and tool changing means operative to place a selected one of a set of tools into position of engagement with the workpiece at the respective station; and automatic programming means for operating said tool changing means during a working cycle, comprising computer-controlled means for initiating, regulating and terminating all operations of the machine.

3. A structure as set forth in claim 1, wherein said tool changing means comprises a magazine for a set of tools mounted on said frame, socket means provided on said one tool support, and transfer means for transferring tools between said magazine and said socket means.

4. A structure as set forth in claim 1, wherein said tool changing means comprises an indexible turret mounted on said one tool support and arranged to carry a plurality of tools at a time.

5. A structure as set forth in claim 1, wherein each of said tool supports comprises tool changing means, one of said tool changing means comprising a magazine for a set of tools mounted on said frame, socket means provided on the respective tool support, and transfer means for transferring tools between said magazine and said socket means, another of said tool changing means comprising an indexible turret mounted on the respective tool support and arranged to carry a plurality of tools.

6. A structure as set forth in claim 1, wherein said programming means comprises computer-controlled means for initiating, regulating and terminating all operations of said machine.

7. A structure as set forth in claim 6, wherein said programming means is an electric programming system.

8. A structure as set forth in claim 6, wherein said programming means is a hydraulic programming system.

9. A structure as set forth in claim 1, further comprising drive means for each of said tool supports, said programming means comprising means for storing information pertaining to rated distances to be covered by said tool supports, means for measuring the actual distances covered by said tool supports, means for comparing actual distances with rate distances, and means for arresting said drive means in response to coincidence of rated distances with actual distances.

10. A structure as set forth in claim 1, wherein each of said tool supports comprises a first slide movable in the axial direction and a second slide movable at right angles to the axes of said spindles, one of said slides being supported by said frame and the other slide being supported by said one slide.

11. A structure as set forth in claim, wherein said frame comprises a portion located at a level above said carrier and wherein said tool supports are mounted on said portion of said frame.

12. A structure as set forth in claim 1, further comprising a receptacle for shavings disposed at a level below said stations, the area between said receptacle and said stations being free of any machine parts so that the shavings removed by tools during engagement with the workpieces at said stations are free to descend into said receptacle.

13. A structure as set forth in claim 12, wherein said frame defines a chamber having two open sides and accommodating said working stations.

References Cited
UNITED STATES PATENTS

| | | | |
|---|---|---|---|
| 2,540,186 | 2/1951 | Bullard et al. | 29—38 |
| 2,579,998 | 12/1951 | Bullard | 137—144 |
| 3,238,615 | 3/1966 | Leone | 29—568 |
| 3,186,085 | 6/1965 | Coate | 29—568 |
| 3,259,976 | 7/1966 | Bergstrom | 29—568 |
| 3,355,797 | 12/1967 | Lohneis | 29—568 |

RICHARD H. EANES, JR., *Primary Examiner.*